United States Patent
Sivaraj et al.

(10) Patent No.: US 10,523,466 B1
(45) Date of Patent: Dec. 31, 2019

(54) ALIASING IN AN ACTIVE-ACTIVE MULTI-HOMED PBB-EVPN NETWORK

(71) Applicant: Juniper Networks, Inc., Sunnyvale, CA (US)

(72) Inventors: SelvaKumar Sivaraj, Sunnyvale, CA (US); Sharan Rachanagouda Bhadragoudar, Sunnyvale, CA (US); Ajay V. Gaonkar, Cupertino, CA (US); Mukesh Kumar, Cupertino, CA (US); Binu S, Bangalore (IN); Avijit Basu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 251 days.

(21) Appl. No.: 15/788,378

(22) Filed: Oct. 19, 2017

(51) Int. Cl.
*H04L 12/46* (2006.01)
*H04L 29/12* (2006.01)
*H04L 12/18* (2006.01)

(52) U.S. Cl.
CPC ........ *H04L 12/4679* (2013.01); *H04L 61/103* (2013.01); *H04L 61/1547* (2013.01); *H04L 12/1886* (2013.01); *H04L 61/6022* (2013.01)

(58) Field of Classification Search
CPC ............... H04L 12/4679; H04L 61/103; H04L 61/1547; H04L 12/1886; H04L 61/6022
See application file for complete search history.

(56) References Cited

U.S. PATENT DOCUMENTS

| 7,184,437 | B1 | 2/2007 | Cole et al. | |
|---|---|---|---|---|
| 2009/0109848 | A1* | 4/2009 | Hato | H04L 12/4641 370/235 |
| 2012/0014386 | A1* | 1/2012 | Xiong | H04L 29/12028 370/392 |
| 2016/0134528 | A1* | 5/2016 | Lin | H04L 45/66 709/238 |

OTHER PUBLICATIONS

Sajassi et al., "Provider Backbone Bridging Combined with Ethernet VPN (PBB-EVPN)," RFC 7623, Internet Engineering Task Force (IETF), Sep. 2015, 23 pp.
Sajassi et al., "BGP MPLS-Based Ethernet VPN," RFC 7432, Internet Engineering Task Force (IETF), Feb. 2015, 56 pp.
"IEEE Standard for Local and metropolitan area networks—Virtual Bridged Local Area Networks, Amendment 7: Provider Backbone Bridges," IEEE Computer Society, IEEE Std 802.1ah, Jun. 12, 2008, 110 pp.

* cited by examiner

*Primary Examiner* — Wing F Chan
*Assistant Examiner* — Billy H Ng
(74) *Attorney, Agent, or Firm* — Shumaker & Sieffert, P.A.

(57) ABSTRACT

Techniques are described for providing aliasing in an active-active multi-homed Provider Backbone Bridging Ethernet Virtual Private Network (PBB-EVPN) network. For example, PE devices of a multi-homed Ethernet segment may send packets received from the PBB-EVPN core network over the Ethernet segment to the customer device even if the receiving PE device has not learned the source MAC address of the CE device. In particular, the PE devices (Continued)

coupled to the multi-homed Ethernet segment may apply aliasing techniques in which a PE device performs a lookup of a BMAC address and the Customer Virtual Local Area Network (C-VLAN), instead of a lookup of a destination MAC address, to determine the path to send the data traffic.

18 Claims, 4 Drawing Sheets

PBB-EVPN PACKET 400

| DESTINATION B-MAC 402 | SOURCE B-MAC 404 | I-SID 406 | DESTINATION C-MAC 408 | SOURCE C-MAC 410 | S-VLAN TAG 412 | C-VLAN TAG 414 | L2 PAYLOAD 416 |
|---|---|---|---|---|---|---|---|
| ESI_BMAC 403 | | | | | | | |

FIG. 4A

B-MAC ROUTE TABLE 420

| ESI | B-MAC | IFL |
|---|---|---|
| 422 ESI 13 | 424 B-MAC1 | 426 IFLS TO CUSTOMER NETWORK 7A |
| N/A | B-MAC2 | IFL TO CUSTOMER NETWORK 7B |

PE DEVICE 6A — PE DEVICE 6B
PE DEVICE 6C

FIG. 4B

B-MAC AND C-VLAN TABLE 430

| B-MAC | C-VLAN |
|---|---|
| 432 B-MAC1 | 434 C-VLAN OF CUSTOMER NETWORK 7A |
| ------ | ------ |

FIG. 4C

ALIASING IN AN ACTIVE-ACTIVE MULTI-HOMED PBB-EVPN NETWORK

TECHNICAL FIELD

The invention relates to computer networks and, more specifically, to forwarding packets within computer networks.

BACKGROUND

An Ethernet Virtual Private Network (EVPN) is a network service that provides Ethernet connectivity for two or more remote layer two (L2) local area networks (LANs) through an intermediate layer three (L3) network (usually referred to as a provider network), in a transparent manner, i.e., as if the intermediate L3 network does not exist. In particular, an EVPN transports L2 communications, such as Ethernet packets or "frames," between remote networks via the intermediate multiprotocol label switching (MPLS) network. In a typical configuration, provider edge (PE) network devices (e.g., routers and/or switches) of the intermediate networks coupled to the customer edge (CE) network devices of the customer networks define label switched paths (LSPs) (also referred to as pseudowires) within the intermediate network to carry encapsulated L2 communications as if these customer networks were directly attached to the same local area network (LAN).

A provider backbone bridged (PBB) EVPN combines EVPN services as well as MAC-in-MAC encapsulation when transporting L2 communications. That is, each customer frame transported through the PBB-EVPN utilizes MAC-in-MAC encapsulation in which customer MAC (C-MAC) addresses within the header are encapsulated within backbone MAC (B-MAC) addresses, thereby maintaining separation between the provider L2 domain and the customer L2 domain.

In a PBB-EVPN, a set of PE devices may operate in a common Ethernet segment in active-active mode with all PE routers forwarding network traffic in the Ethernet segment. One of the PE devices in the Ethernet segment may operate as a designated forwarder (DF) to forward Broadcast, Unknown unicast, and Multicast (BUM) traffic while the other PE devices, e.g., non-designated forwarders (non-DFs), in the Ethernet segment drop BUM traffic. The Ethernet segment may also be associated with a B-MAC address, which is used by remote PE devices to forward network traffic through a service provider network to the set of PE devices included in the common Ethernet segment.

SUMMARY

In general, techniques are described for providing aliasing in an active-active multi-homed Provider Backbone Bridging Ethernet Virtual Private Network (PBB-EVPN) network. For example, in a PBB-EVPN operating in redundancy mode, a customer edge (CE) device is multi-homed to multiple PE devices by a group of links, referred to as an Ethernet Segment. The techniques described herein may be applied by the PE devices of the multi-homed Ethernet segment to send packets received from the PBB-EVPN core network over the Ethernet segment to the customer device even if the receiving PE device is a non-DF for the Ethernet Segment and has not previously learned the MAC address of the Customer Edge (CE) device. In particular, as described herein, the PE devices coupled to the multi-homed Ethernet segment may apply aliasing techniques in which a non-DF PE device performs a lookup of a BMAC address and the Customer Virtual Local Area Network (C-VLAN), instead of a lookup of a destination MAC address, to determine the path to send the data traffic.

In this way, the techniques described in this disclosure enable PE devices of the active-active multi-homed Ethernet segment of a PBB-EVPN to forward packets received from the PBB-EVPN core to a customer device even when the receiving PE device has not previously learned the destination MAC address of the customer device. As such, the techniques may be used to ensure that packets received from the PBB-EVPN core by a non-designated forwarder (non-DF) one of the PE devices of the multi-homed Ethernet segment are not dropped, but instead are forwarded on the Ethernet segment.

In one example, a method may include receiving, by a provider edge (PE) device of a plurality of PE devices that implement a provider backbone bridging Ethernet Virtual Private Network (PBB-EVPN), a packet over the PBB-EVPN, wherein the plurality of PE devices is coupled to a multi-homed customer edge (CE) device by an Ethernet segment and provide an active-active configuration for the PBB-EVPN. The method may also include determining, by the PE device, a local interface of the PE device via a lookup operation based at least on a backbone Media Access Control (B-MAC) address and a customer Virtual Local Area Network (C-VLAN) address specified by the packet without determining the local interface based on a destination C-MAC address specified by the packet. The method may further include sending, by the PE device, the packet to the CE device via the local interface.

In another example, a provider edge (PE) device may include a routing component having at least one processor coupled to a memory, wherein the routing component executes software configured to establish a provider backbone bridging Ethernet Virtual Private Network (PBB-EVPN) with one or more other PE devices; a core-facing interface to receive packets over the PBB-EVPN; a customer-facing interface that connects the PE device to a customer edge (CE) device by an Ethernet segment, wherein the CE device is multi-homed to a second one of the other PE devices by the Ethernet segment, and wherein the PE device and the second one of the other PE devices provide an active-active configuration for the PBB-EVPN; a forwarding component configured to: determine a local interface of the PE device via a lookup operation based at least on a backbone Media Access Control (B-MAC) address and a customer Virtual Local Area Network (C-VLAN) address; and send the packet to the CE device via the local interface.

In another example, a system may include a provider backbone bridging Ethernet Virtual Private Network (PBB-EVPN) coupling at least a first provider edge (PE) device, a second PE device, and a third PE device, wherein the first PE device and second PE device are coupled to a multi-homed customer edge (CE) device by an Ethernet segment and provide an active-active configuration for the PBB-EVPN; wherein the first PE device is a designated forwarder configured to forward originating traffic over the PBB-EVPN to the third PE device, wherein the second PE device is a non-designated forwarder configured to: receive a packet over the PBB-EVPN from the third PE device; determine a local interface of the second PE device via a lookup operation based at least on a backbone Media Access Control (B-MAC) address and a customer Virtual Local Area Network (C-VLAN) address specified by the packet without determining the local interface based on a destination C-MAC address specified by the packet; and send the packet to the CE device via the local interface, and wherein the third PE device is configured to load-balance the return traffic to the first PE device and the second PE device.

The details of one or more examples of the techniques described herein are set forth in the accompanying drawings and the description below. Other features, objects, and advantages of the techniques described herein will be apparent from the description and drawings, and from the claims.

BRIEF DESCRIPTION OF DRAWINGS

FIGS. 4A-4C are example block diagrams illustrating an example PBB-EVPN encapsulated packet header, B-MAC table, and B-MAC and C-VLAN table, respectively, in accordance with techniques described in the disclosure.

DETAILED DESCRIPTION

Figure 1:
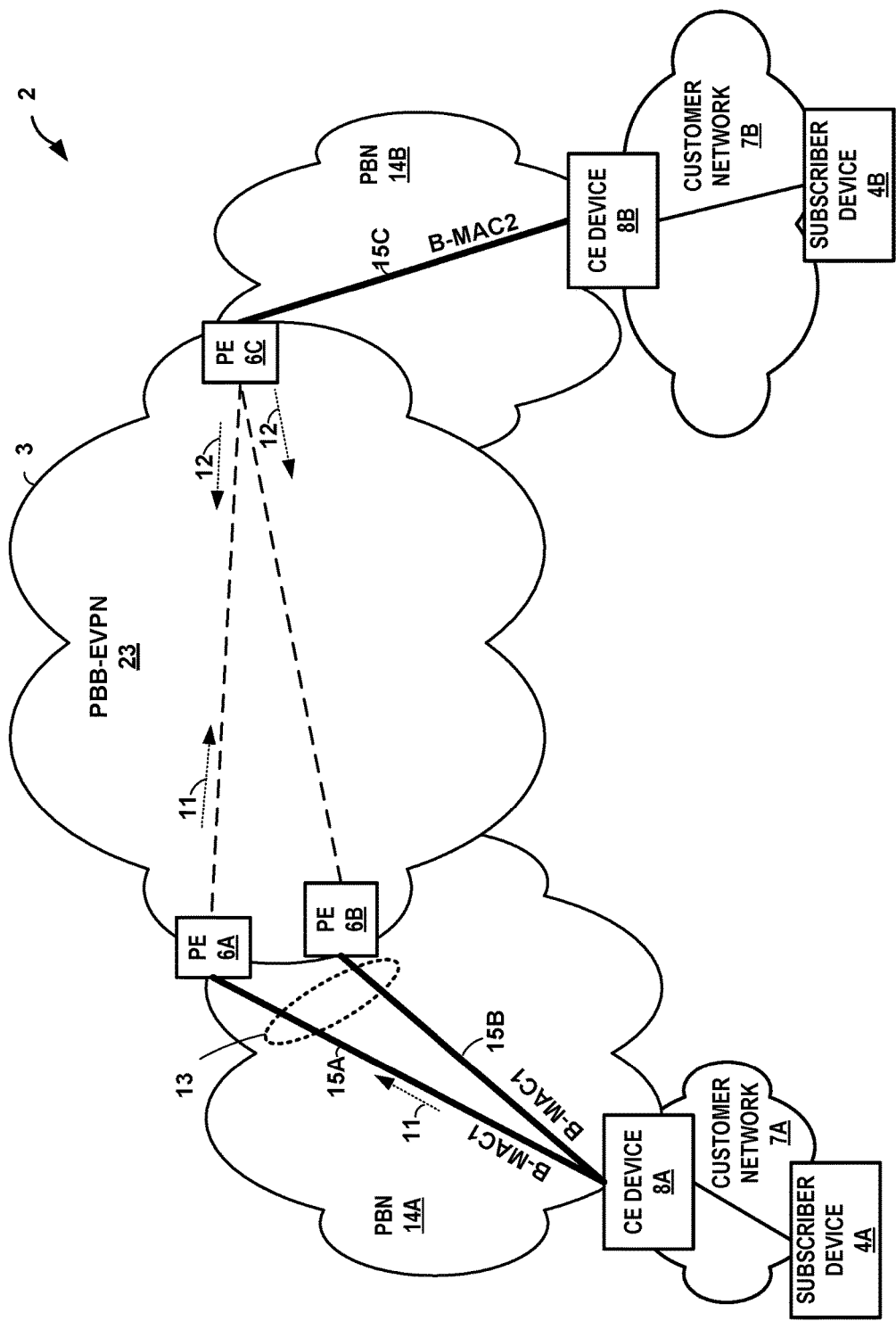
FIG. 1 is a block diagram illustrating an example network system in which provider edge devices coupled to a common Ethernet segment performs aliasing in active-active multi-homed Ethernet segment for a Provider Backbone Bridged Ethernet Virtual Private Network (PBB-EVPN), in accordance with the techniques described in this disclosure.

FIG. 1 is a block diagram illustrating an example network system 2 in which provider edge (PE) routers coupled to a common Ethernet segment (ES) applies the techniques described herein to provide aliasing in active-active multi-homed Ethernet segment for Provider Backbone Bridged Ethernet Virtual Private Network (PBB-EVPN). As shown in the example of FIG. 1, PE devices 6A, 6B, and 6C (collectively, "PE devices 6") (e.g., routers and/or switches) may operate at the border of network 3 and provide connectivity for provider bridge networks (PBN) 14A and 14B (collectively, "PBNs 14"). Network 3 may be a wide area network (WAN), local area network (LAN), personal area network (PAN), metropolitan area network (MAN), internet area networks (IAN), campus area networks (CAN), and any network capable of transmitting traffic exchanged between PE devices 6. Network 3 may be used to connect individual subscribers, businesses, or even large-scale data centers to a larger service network or the Internet. In one example, network 3 conforms to the standards set forth in "Provider Backbone Bridging Combined with Ethernet VPN (PBB-EVPN)," Internet Engineering Task Force (IETF), RFC 7632, September 2015, the entire contents of which are incorporated herein by reference.

In general, each of PBNs 14 includes one or more customer edge (CE) devices 8A and 8B (collectively, "CE devices 8") (e.g., routers and/or switches) that connect the PBNs 14 to subscriber devices 4A, 4B (collectively, "subscriber devices 4"), respectively, that provide computing environments for subscribers or customers. Each of PBNs 14 also includes one or more of the PE devices 6 that connect the PBNs 14 via PBB-EVPN 23.

PBB-EVPN 23 provides layer two (L2) connectivity between the PBNs 14. Each of PBNs 14 represents an infrastructure of a service provider that provides bridged local area network services to L2 customer networks. Each of PBNs 14 provides one or more service VLANs (S-VLANs) to services and isolate L2 traffic from L2 customer networks 7A, 7B (collectively, "customer networks 7"). PBNs 14 may include L2 bridging networks provided by the same network service provider or by one or more different service providers. Although shown by way of example with respect to two PBNs 14A, 14B, network 3 may include more than two PBNs.

In the example of FIG. 1, PBB-EVPN 23 is composed of a set of Backbone Edge Bridges (BEBs) provided by backbone-facing (i.e., core-facing) components of PE devices 6. That is, each of PE devices 6 provides a BEB for bridging to the backbone domain of PBB-EVPN 23. Each BEB of PE devices 6 provides interfaces that encapsulate (or verifies the encapsulation of) and aggregate customer frames, thus allowing customer MAC (C-MAC) addresses and VLANs to be independent of the backbone MAC (B-MAC) addresses and VLANs administered by the PBB-EVPN operator. In this way, each of PBNs 14 provide L2 bridging connectivity for one or more of L2 customer networks 7. In this example, subscriber device 4A of L2 customer network 7A is coupled to PBN 14A by CE device 8A. Subscriber device 4B of L2 customer network 7B is coupled to PBN 14B by CE device 8B.

PE devices 6 that form the ends of tunnels within the backbone domain provided by PBB-EVPN 23 typically learn and maintain L2 state information (e.g., media access control (MAC) addresses and respective physical ports by which the MAC addresses are reachable) for devices within the PBB-EVPN 23. PE devices 6 may also learn and maintain L2 state information including MAC addresses and corresponding ports for devices in both the customer domain and the backbone domain to provide bridging services as BEBs. Conversely, CE devices 8 may learn and maintain L2 state information including MAC addresses for subscriber devices 4 within a customer domain 7. In this way, PE devices 6 may provide a PBB-EVPN interconnect between subscriber devices 4. As such, each of PE devices 6 operates as a gateway between PBB-EVPN 23 and PBN 14, and may function as tunneling endpoints with respect to PBNs 14. That is, each of PE devices 6 may include logically separate routing instances for PBN 14 and PBB-EVPN 23 and each operates to bridge traffic between the two distinct internal routing instances.

In operation, L2 network communications (e.g., Ethernet packet frames) flow between PBNs 14 via PBB-EVPN 23. Customer traffic originating from L2 customer networks 7 typically arrive at CE devices 8 in association with a customer VLAN (C-VLAN). That is, packets from L2 customer networks 7 typically carry C-VLAN tags and customer VLAN identifiers (C-VID) in addition to source and destination media access control (MAC) addresses for devices within the L2 customer networks 7. PE devices 6 receive the L2 communications from L2 customer networks 7 and associate the communications with a service VLAN (S-VLAN) defined within the PBN, such as PBN 14. Each S-VLAN has a corresponding identifier (S-VID), which is tagged in each L2 frame with a corresponding PBN 14 with which the L2 frame was received.

Traffic flowing from one PBN 14 through PBB-EVPN 23 to a different PBN 14 is carried by the S-VLAN and is further multiplexed within a backbone VLAN (B-VLAN) and service ID (I-SID) that uniquely identifies the subscriber devices 4 (e.g., by customer MAC (C-MAC) address), in addition to source and destination backbone MAC (B-MAC) addresses for PE devices 6 within PBB-EVPN 23. As operational BEBs, PE devices 6 provide a mapping between the VLAN and MAC address space of PBNs 14 and PBB-EVPN 23. Each of PE devices 6 may have a set of one or more B-MAC addresses associated with the C-MAC addresses and associated with a Backbone Edge Bridge (BEB) functionality, and the B-MAC addresses are exchanged between PE devices 6 over the network 3 (such as the MPLS core), such as by MAC Advertisement routes utilizing Border Gateway Protocol (BGP). In the example of FIG. 1, PE devices 6A, 6B may each be configured with a B-MAC address of B-MAC1. Each of PE devices 6A, 6B may advertise the B-MAC address to PE device 6C using BGP. This way, PE devices 6 may distribute B-MAC addresses of the PE devices instead of C-MAC addresses of subscriber devices 4.

In one example, packet frames may flow from CE device 8A to other CE devices 8 over a S-VLAN bridged to flow through a B-VLAN, which in turn is tunneled through transport MPLS label switched paths (LSPs) of the PBB-EVPN 23. The traffic of S-VLAN may flow through PBB-EVPN 23 from PE device 6A to other PE devices 6 via B-VLAN in which the traffic is further encapsulated and de-capsulated via PE devices 6 operating as BEBs. Each of PE devices 6 has a set of one or more B-MAC addresses associated with it, which are exchanged between the PE devices over the network 3 (e.g., MPLS core network) in MAC Advertisement routes. PE devices 6 may receive Ethernet packets from a customer and may encapsulate the packets with the Ethernet Provider Backbone Bridging (PBB) header and Multiprotocol Label Switching (MPLS) header, and forward the encapsulated packet over the core network 3. Likewise, PE devices 6 may receive the encapsulated packets from the PBB-EVPN and de-capsulate the PBB header and MPLS header from the packet. In this way, PE devices 6 provide bridging services as BEBs for traffic flowing between PBNs 14 and PBB-EVPN 23.

In the example of FIG. 1, CE device 8A is "multi-homed" in that the CE device is connected to multiple PE devices 6 by a respective Ethernet segment 13. When CE device 8A is multi-homed to two or more PE devices, e.g., PE devices 6A and 6B, as shown in this example, the set of Ethernet links 15A, 15B (collectively, "links 15") constitutes Ethernet segment 13. Ethernet segment 13 appears as a single logical interface (IFL) associated with a Link Aggregation Group (LAG) to CE device 8A. In the example of FIG. 1, links 15A, 15B from PE devices 6A, 6B to which CE device 8A is multi-homed form Ethernet segment 13.

When CE device 8A is multi-homed to PE devices 6A and 6B, PE devices 6A, 6B may operate in "active-active mode" when forwarding network packets between PE device 6C and CE device 8A. In active-active mode (otherwise referred to as "all-active" mode), PE routers 6A, 6B each operate concurrently to forward traffic between CE router 8A and PE router 6C. That is, each of PE routers 6A, 6B are "active" in that they can both forward traffic between CE router 8A and PE device 6C.

To avoid redundancy, one of the PE devices, referred to as the designated forwarder (DF), assumes the primary role for forwarding broadcast, unknown unicast, and multicast (BUM) traffic, from PBB-EVPN 23 to CE device 8A. That is, for Ethernet segment 13, the respective PE device 6 elected as the DF for that Ethernet segment assumes responsibility for forwarding BUM traffic, received from PBB-EVPN 23 via a core-facing interface, toward CE device 8A coupled to that Ethernet segment. For example, PE device 6A, which may be elected as the DF router, may forward BUM traffic received from PBB-EVPN 23 via core-facing interface toward CE device 8A coupled to Ethernet segment 13. The remaining PE devices 6 coupled to that same Ethernet segment, e.g., PE device 6B, are referred to as non-designated forwarders (non-DFs) or backup designated forwarders (BDFs) and do not forward BUM traffic received from PBB-EVPN 23 into the respective Ethernet segment. In this way, links 15A, 15B within PBN 14A provide connectivity of customer network 7A.

In one instance, CE device 8A may send originating traffic to CE device 8B. When CE device 8A sends traffic to CE device 8B, the traffic is sent to either PE device 6A or 6B. In this example, PE device 6A, the DF router, may receive traffic from CE device 8A. When PE device 6A receives traffic from CE device 8A, PE device 6A learns of the C-MAC address, e.g., over the attachment circuits in the data plane. That is, outbound packets from CE device 8A carries the MAC address of the CE device as the source MAC for the packets, and PE device 6A performs L2 learning by associated the MAC address of CE device 8A with the customer-facing interface associate with Ethernet segment 13. PE device 6A encapsulates a PBB header to the traffic and sends the packet over PBB-EVPN 23.

PE device 6C receives the packet, de-encapsulates the PBB header from the traffic, and delivers the traffic to CE device 8B. PE device 6C may in turn send return traffic 12 over PBB-EVPN 23 toward CE device 8A. In this example, PE device 6C may load balance the return traffic 12 to PE devices 6A and 6B since PE devices 6A and 6B operate in active-active mode. For example, each of PE devices 6A and 6B may advertise the same B-MAC address, e.g., B-MAC1. Since the B-MAC address advertised by PE devices 6A and 6B are the same, PE device 6C may determine that PE devices 6A and 6B are coupled to Ethernet segment 13 and are operating in active-active mode.

When PE device 6B receives the return traffic 12 destined for subscriber device 4A, PE device 6B typically de-encapsulates the outer PBB header and performs a lookup of the inner headers (e.g., destination C-MAC address) to determine the customer-facing interface for which PE device 6B should forward the traffic. However, in this example, PE device 6B did not forward traffic onto the PBB-EVPN 23 core. As such, PE device 6B has no knowledge of the C-MAC address that sent the originating traffic and is therefore unable to send return traffic 12 toward customer device 8A. In other words, PE device 6B may not have performed L2 MAC learning with respect to the MAC address of CE device 8A. Without having previously learned of the C-MAC address, PE device 6B would otherwise process the packet as so-called 'BUM' traffic to be flooded, but since PE device 6B is a non-DF router for Ethernet segment 13, the forwarding plane of PE device 6B is typically configured not to flood the return traffic over Ethernet segment 13 but instead drop the packets. Thus, PE device 6B would continue dropping traffic until PE device 6B learns of the C-MAC address, e.g., by receiving and sending traffic originating from CE device 8A over the PBB-EVPN 23 core.

In accordance with the techniques described herein, a PE device may be configured to provide aliasing in an active-active multi-homed Ethernet segment for PBB-EVPN. As used herein, aliasing generally refers to the ability of a PE device to reach a given locally attached Ethernet segment, even when it has not learned any specific customer MAC addresses from that segment. As further described below, each of PE devices 6 may construct a B-MAC and C-VLAN table such that the PE devices 6 may perform a lookup of the B-MAC and C-VLAN table rather than a destination C-MAC lookup. Each of PE devices 6 may perform a lookup of the B-MAC and C-VLAN table to determine a customer-facing interface such that the PE device may forward return traffic 12 towards a customer-facing interface even though the PE device has no knowledge of (i.e., has not learned) the local C-MAC address of the CE device. PE devices 6 may in some examples construct a separate B-MAC and C-VLAN table for each routing instance ID. In other examples, PE devices 6 may construct a single B-MAC and C-VLAN table that includes an entry for the routing instance IDs.

In one example, PE device 6B may receive, via a core-facing interface and from PE device 6C, return traffic 12 over PBB-EVPN 23. PE device 6B may determine that the outer PBB header of return traffic 12 includes a B-MAC address that corresponds to the ESI of Ethernet segment 13 (referred to herein as "ESI_B-MAC"). In this case, i.e., so-called mac-in-mac encapsulation, the ESI_B-MAC in the outer PBB header causes PE device 6B to perform a lookup of a B-MAC and C-VLAN table constructed in PE device 6B, and to eschew a destination C-MAC lookup (i.e., a lookup of the inner header), to determine a customer-facing interface for which to send the return traffic for the particular routing instance. For instance, PE device 6B may perform a lookup of a B-MAC address in a B-MAC table and may identify a plurality of interfaces that are active on the ESI. Because each of the interfaces have a different VLAN, PE device 6B may perform a lookup of the B-MAC address in the B-MAC and C-VLAN table such that PE device 6B may identify an associated C-VLAN address. In this way, PE device 6B, which has no knowledge of the C-MAC address that originated the traffic, may perform a lookup of the B-MAC and C-VLAN table rather than a destination C-MAC lookup, and may determine the customer-facing interface to forward the return traffic instead of dropping the traffic.

In some examples, certain values (addresses) for the ESI_B-MAC may be defined to indicate the type of return traffic. For example, a particular value of an ESI_B-MAC within the outer header of the packet may be used to indicate to a receiving PE device, e.g., PE device 6B, that the return traffic is unicast traffic, whereas another ESI_B-MAC value may be defined and used to indicate the return traffic is BUM traffic. In instances where PE device 6B receives a ESI_B-MAC indicating the return traffic is unicast traffic, PE device 6B may perform the lookup of the B-MAC and C-VLAN table as described above. In instances where PE device 6B receives an ESI_B-MAC indicating the return traffic is to be treated as BUM traffic, PE device 6B may perform the traditional lookup of the destination CMAC address.

In another example, PE device 6B may receive unicast return traffic and perform the traditional destination C-MAC address lookup, and upon determining a lookup failure (i.e., that the C-MAC has not been learned on the Ethernet segment), may perform a lookup of the B-MAC and C-VLAN table as described herein, thus avoiding packet loss in this situation. For example, PE device 6B may receive the return traffic over PBB-EVPN 23 and perform a destination C-MAC lookup of the inner header of the return traffic. PE device 6B may determine that it does not have knowledge of the C-MAC address for which the traffic is destined. As the non-DF, PE device 6B is unable to flood the return traffic to Ethernet segment 13 and as such, may determine that the traditional lookup has failed. In response, PE device 6B may perform a lookup of the B-MAC and C-VLAN table as described above to determine the customer-facing interface to forward the return traffic.

In this way, the techniques described in this disclosure enable PE devices of the active-active multi-homed Ethernet segment of a PBB-EVPN to forward packets received from the PBB-EVPN core to a customer device even when the receiving PE device has not previously learned the destination MAC address of the customer device. As such, the techniques may be used to ensure that packets received from the PBB-EVPN core by a non-designated forwarder (non-DF) one of the PE devices of the multi-homed Ethernet segment are not dropped, but instead are forwarded on the Ethernet segment.

Figure 2:
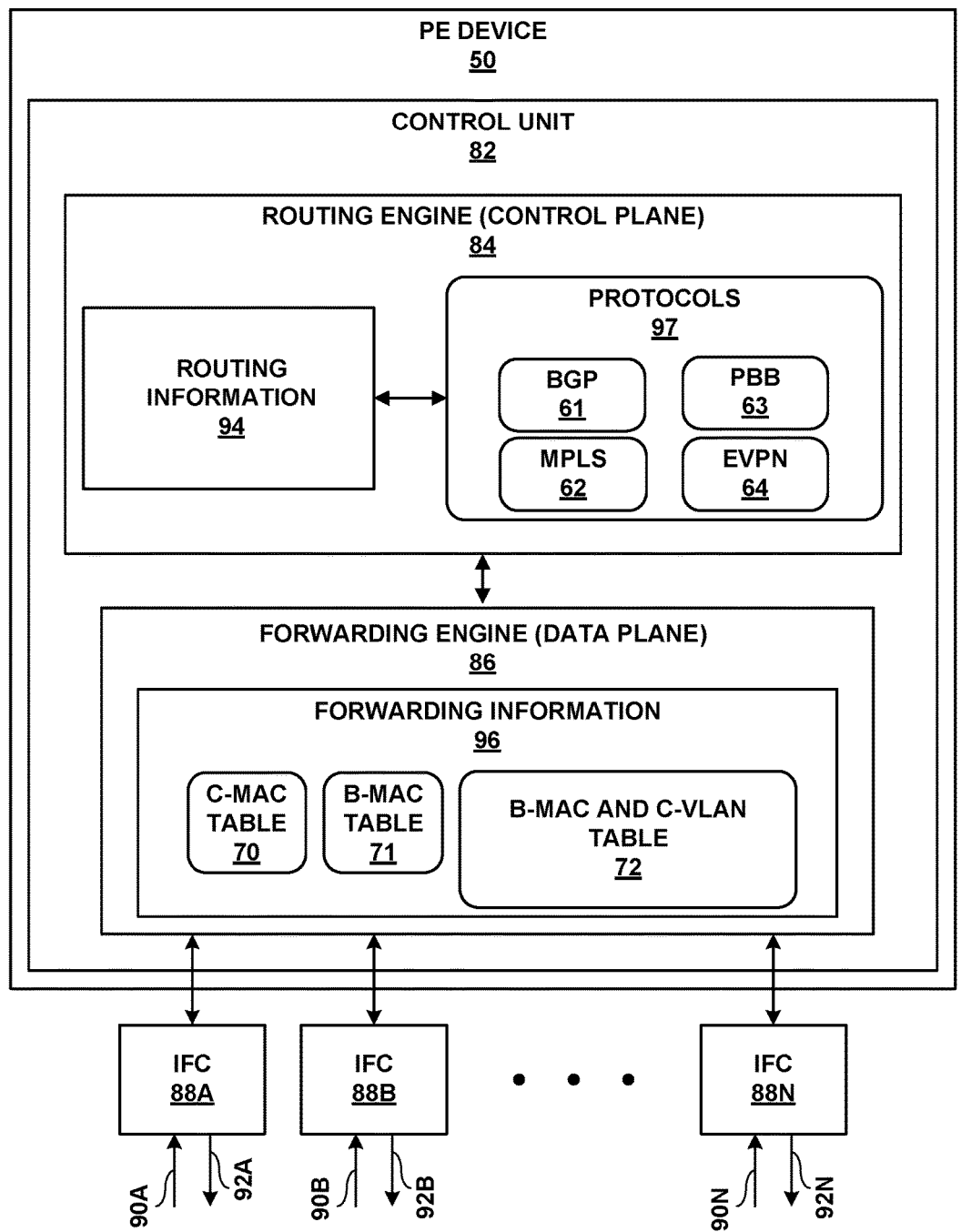
FIG. 2 is a block diagram illustrating an example provider edge device capable of performing the disclosed techniques, in accordance with the techniques described in this disclosure.

FIG. 2 is a block diagram illustrating an example PE device, such as PE device 6B of FIG. 1, capable of performing the disclosed techniques. In this example, PE device 50 includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. PE device 50 also includes a control unit 82 that determines routes of received packets and forwards the packets accordingly via IFCs 88. Although described with respect to PE device 6B as an example, any of PE devices 6 of FIG. 1 may operate according to the example of FIG. 2.

In the example of FIG. 2, control unit 82 includes a routing engine 84 (control plane) that configures and controls packet forwarding operations applied by packet forwarding engine 86 (data plane). Routing engine 84 operates as a control plane for PE device 50 and includes an operating system that provides a multi-tasking operating environment for execution of a number of concurrent processes. That is, routing engine 84 provides an operating environment for execution of various protocols 97 that may comprise software processes having instructions executed by a computing environment. As described in further detail below, protocols 97 provide control plane functions for storing network topology in the form of routing tables or other structures, executing routing protocols to communicate with peer routing devices and maintain and update the routing tables, and providing management interface(s) to allow user access and configuration of PE router 50. Control unit 82 provides an operating environment for routing engine 84 and may be implemented solely in software, or hardware, or may be implemented as a combination of software, hardware and firmware. For example, control unit 82 may include one or more processors which execute software instructions. In that case, routing engine 84 may include various software modules or daemons (e.g., one or more routing protocol processes, user interfaces and the like), and control unit 82 may include a computer-readable storage medium, such as computer memory or hard disk, for storing executable instructions.

In the example of FIG. 2, protocols 97 includes the Border Gateway Protocol (BGP) 61, for exchanging routing information with other routing devices and for updating routing information 94. For example, PE router 50 may use BGP 61 to exchange B-MAC addresses with other PE devices over the PBB-EVPN core. Protocols 97 may also include Multiprotocol Label Switching Protocol (MPLS) 62 for tunneling packets within network 3 via label switched paths. In addition, routing engine 84 executes a PBB protocol 63 so as to implement provider backbone bridging, such as the techniques described in IEEE 802.1ah-2008, Provider Backbone Bridges, June 2008, the entire contents of which are incorporated herein by reference. For example, PBB protocol 63 provides for the exchange of control plane messages that include PBB configuration information, such as announcing B-MAC addresses. In accordance with the techniques, PBB protocol 63 configures forwarding information 96 with forwarding constructs to direct forwarding engine 86 to encapsulate network packets with PBB headers, such as source and destination B-MAC addresses, when injecting the packets into PBB-EVPN 23 and to de-encapsulate the packets when receiving them from the PBB-EVPN. Further, routing engine 84 executes EVPN protocol 64, which operates to communicate with other routers to establish and maintain an EVPN, for transporting L2 communications through an intermediate network so as to logically extend an Ethernet network through the intermediate network. EVPN protocol 64 may operate in accordance with techniques described in "BGP MPLS-Based Ethernet VPN," RFC 7432, February 2015, the entire contents of which are incorporated herein by reference.

In general, routing protocols 97 maintains routing information 94 in the form of routing information base (RIB) that describes a topology of a network, and derives a forwarding information 96 in accordance with the routing information. In general, routing information 94 represents the overall topology of the network, including overlay LSP paths for transporting packets through PBB-EVPN 23. Protocols 97 update routing information 94 based on routing protocol messages received by PE device 50. Routing information 94 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, forwarding information 86 is generated based on selection of certain routes within the network and maps packet key information (e.g., L2/L3 source and destination addresses and other select information from a packet header) to one or more specific next hops forwarding structures within forwarding information 96 and ultimately to one or more specific output interface ports of IFCs 88. Routing engine 84 may generate forwarding information 96 in the form of a radix tree having leaf nodes that represent destinations within the network. Example details of an example embodiment of a router that utilizes a radix tree for route resolution are provided in U.S. Pat. No. 7,184,437, the contents of which being incorporated herein by reference in its entirety.

As described herein, routing engine 84 communicates with other routers to establish and maintain a PBB-EVPN, such as the PBB-EVPN 23, for transporting communications through networks so as to logically extend an Ethernet network through the intermediate network. Routing engine 84 may, for example, communicate with PBB-EVPN protocols executing on remote routers to establish tunnels (e.g., LSPs or GRE tunnels) for transporting the packets through the PBB-EVPN. As such, routing information 94 includes routing information for interfacing with the PBB-EVPN as well as customer networks, such as service identifier (I-SID) information, customer virtual local area network (C-VLAN) information, and service virtual local area network (S-VLAN) information. Moreover, routing engine 84 maintains backbone MAC (B-MAC) address tables (e.g., as shown in FIG. 4C) in the control plane of PE device 50, where a B-MAC table includes one or more B-MAC addresses 76 as keys and a list of identifiers of PE devices included in an Ethernet segment that corresponds to the B-MAC address. Routing information 94 may include the B-MAC address of PE device 50 and B-MAC address of other PE devices, e.g., PE device 6A, as well as information on the local interfaces associated with the B-MAC address.

When implementing the PBB-EVPN, PE device 50 performs L2 customer MAC (C-MAC) learning in the data-plane, i.e., within forwarding engine 86 as packets are forwarded. In this way, C-MAC addresses are not typically distributed by control plane MAC Advertisement routes over the network 3. In contrast, L2 B-MAC learning may be performed in the control plane by exchanging, with remote PE devices, BGP messages containing B-MAC addresses. PBB protocol 63 configures forwarding information 96 within forwarding engine 86 so as to implement provider backbone bridging when forwarding packets. For example, PBB protocol 63 communicates B-MAC addresses 76 for a PBB, as recorded in B-MAC tables, to forwarding engine 86 so as to configure forwarding information 96. In this way, forwarding engine 86 may be programmed with associations between each tunnel and output interface and specific source B-MAC addresses reachable via those tunnels.

As explained above, forwarding information 96 associates network destinations with specific next hops and corresponding IFCs 88 and physical output ports for output links 92. Moreover, forwarding information 96 may specify operations, such as encapsulation with PBB-EVPN tags or de-encapsulation of packets, to be applied when forwarding packets to the next hops. Forwarding information 96 may be a radix tree programmed into dedicated forwarding chips, a series of tables, a complex database, a link list, a radix tree, a database, a flat file, or various other data structures. In some examples, forwarding engine 86 arranges forwarding structures as next hop data that can be chained together as a series of "hops" along an internal packet forwarding path for the network device. In many instances, the forwarding structures perform lookup operations within internal memory of ASICs included in forwarding engine 86, where the lookup may be performed against a tree search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs determines the manner in which a packet is forwarded or otherwise processed by forwarding engine 86 from its input interface on one of IFCs 88 to its output interface on one of IFCs 88.

As shown in FIG. 2, forwarding information 96 includes C-MAC table 70. C-MAC table 70 includes data representing mappings or associations between C-MAC addresses and B-MAC addresses. In some examples, C-MAC table 70 includes a C-MAC address as a key and a B-MAC address as the corresponding value, or vice versa. Forwarding information 96 also includes B-MAC table 71. B-MAC table 71 includes data representing mappings or associations between B-MAC addresses and Ethernet segments. For instance, B-MAC table 71 includes a B-MAC address as key and a list of identifiers of PE routers included in an Ethernet segment that corresponds to the B-MAC address. The identifiers may include local interfaces in which PE devices may send traffic. However, a lookup of a B-MAC address in B-MAC table 71 may identify a plurality of interfaces that are active on the ESI. Because each of the interfaces have a different VLAN, forwarding information 96 may also include a B-MAC and C-VLAN table 72 such that a lookup of the B-MAC address may identify an associated C-VLAN address, as further described below.

In accordance with the techniques described herein, B-MAC and C-VLAN table 72 includes data representing mappings or associations between B-MAC addresses and C-VLAN addresses. In some examples, B-MAC and C-VLAN table 72 includes a B-MAC address as a key and a C-VLAN address as the corresponding value, or vice versa. As described above, a lookup of a B-MAC address in B-MAC and C-VLAN table 72 may identify an associated C-VLAN address such that PE device 50 may identify the customer-facing interface to forward the return traffic.

In accordance with the techniques of this disclosure, routing engine 84 configures forwarding engine 86 to perform aliasing in an active-active multi-homed PBB-EVPN network. Forwarding engine 86 applies the techniques described herein to ensure that traffic received over the PBB-EVPN 23 by one of the PE devices 6 coupled to the Ethernet segment that has no knowledge of the C-MAC address may perform a lookup of the B-MAC and C-VLAN table 72 to identify the customer-facing interface for which to send the return traffic. That is, in reference to the example of FIG. 2, forwarding engine 86 of PE device 50 provides a B-MAC and C-VLAN table 72 to ensure traffic is forwarded toward the customer network rather than dropped because the C-MAC address is not known. In particular, when forwarding a packet, forwarding engine 86 determines whether the received packet includes an ESI_B-MAC in the outer PBB header. Responsive to a determination that the packet includes the ESI_B-MAC in the outer PBB header, forwarding engine 86 performs a lookup of the B-MAC and C-VLAN table 72 to identify a customer-facing interface for which to send the return traffic. Forwarding engine 86 then forwards traffic along the customer-facing interface.

The architecture of PE device 50 illustrated in FIG. 2 is shown for exemplary purposes only. The examples described herein are not limited to this architecture. In other examples, PE device 50 may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors that execute software instructions. In that case, the various software modules of control unit 82 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Figure 3:
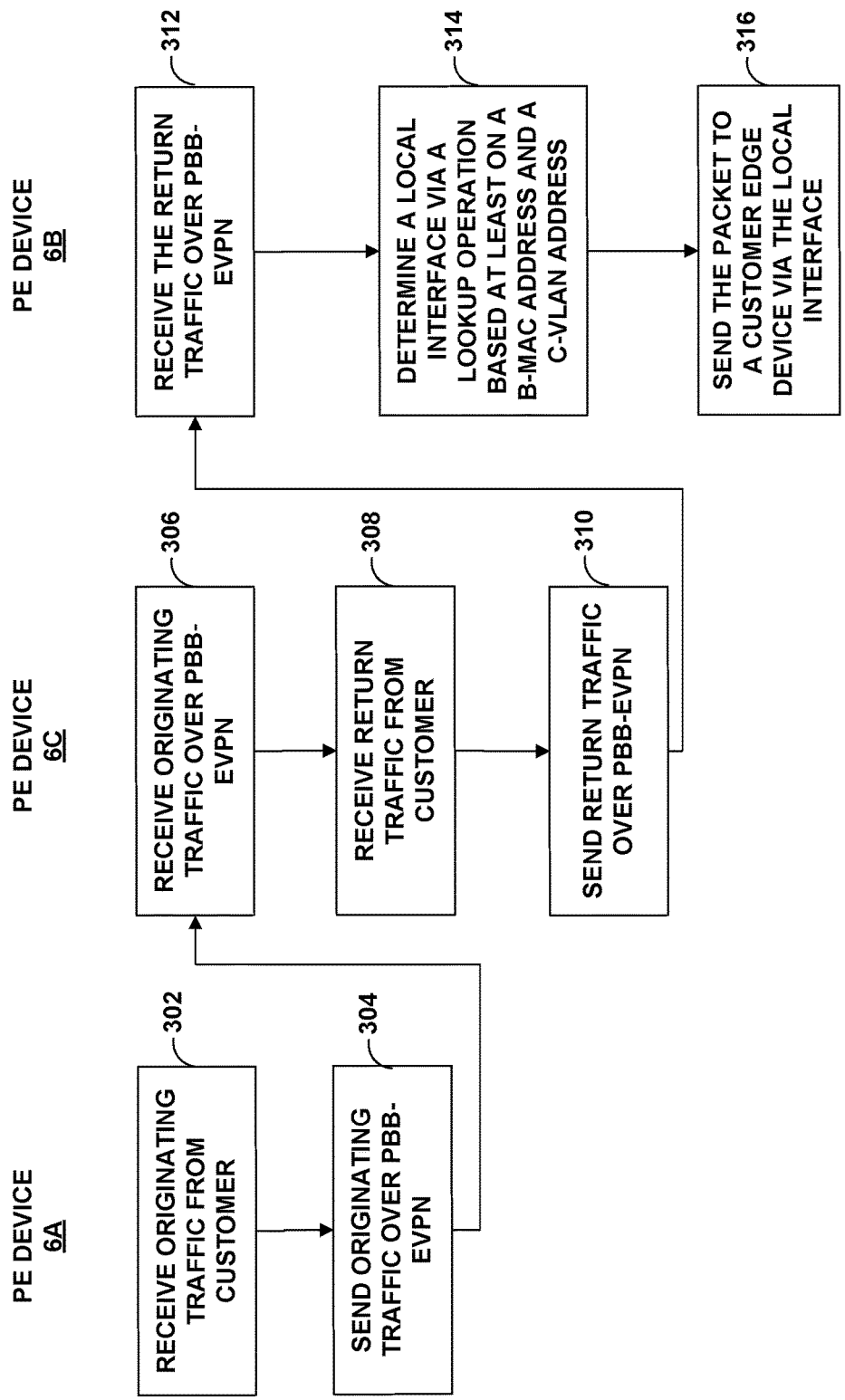
FIG. 3 is a flowchart illustrating an example operation of a provider edge device providing aliasing in active-active multi-homed Ethernet segment for PBB-EVPN, in accordance with the techniques described herein.

FIG. 3 is a flowchart illustrating example operation of a PE router in accordance with the techniques described herein. For purposes of example, FIG. 3 is explained with respect to PE devices 6A-6C of FIG. 1.

Initially, PE device 6A, the designated forwarder, may receive originating traffic 11 from customer network 7A via CE device 8A (302). PE device 6A injects traffic 11 into PBB-EVPN 23 such that the traffic is forwarded to remote PE device 6C (304). PE device 6A may encapsulate the traffic to include a PBB header and an MPLS header.

PE device 6C may receive traffic 11 over PBB-EVPN 23 (306). PE device 6C may de-encapsulate the header from traffic 11 and forward the data to customer network 7B via CE device 8B. PE device 6C may in turn receive return traffic 12 from customer network 7B (308). PE device 6C may inject return traffic 12 into PBB-EVPN 23 such that the traffic is forwarded to PE devices 6A and 6B (310). Since PE devices 6A and 6B are operating in active-active mode, PE device 6C load-balances return traffic 12 to PE devices 6A and 6B via PBB-EVPN 23.

PE device 6B may receive the load-balanced return traffic 12 from PE device 6C over the PBB-EVPN via a core-facing interface (312). PE device 6B, which may be a non-designated forwarder (non-DF) router, may receive encapsulated return traffic 12 (e.g., PBB-EVPN traffic shown in FIG. 4A) from the core-facing interface and may identify keys within the encapsulated return traffic, such as the destination B-MAC address. In some examples, PE device 6B may identify a B-MAC associated with an ESI of Ethernet segment 13 included in the outer PBB header of return traffic 12. In response, PE device 6B may invoke the lookup operation to determine the local interface of PE device 6B.

PE device 6B may determine a local interface via a lookup operation based at least on a B-MAC address and a C-VLAN address (314). For example, PE device 6B may perform a lookup operation of a table including B-MAC addresses and C-VLAN addresses. As described in this disclosure, PE device 6B may statically configure a table including at least B-MAC addresses and C-VLAN addresses such that PE device 6B may perform a lookup of the B-MAC and C-VLAN table to determine a local interface for which to send return traffic.

In response to determining the local customer-facing interface, PE device 6B may forward return traffic 12 to CE device 8A on the local interface associated with Ethernet segment 13 (316). In this way, PE device 6B may eschew a traditional lookup of a destination C-MAC address from an inner header of the return traffic—which would otherwise drop the return traffic since PE device 6B has no knowledge of the destination C-MAC address—and instead perform a lookup of the B-MAC and C-VLAN table to determine the local interface.

FIGS. 4A-4C are example block diagrams illustrating an example PBB-EVPN encapsulated packet, an example B-MAC table, and an example B-MAC and C-VLAN table, respectively, that may be utilized by the techniques of the disclosure.

FIG. 4A, for example, is a block diagram illustrating an example packet format for PBB-EVPN packet (e.g., encapsulated return traffic 12) that includes at least a destination B-MAC header 402, a source B-MAC header 404, an I-SID header 406, a destination C-MAC header 408, a source C-MAC header 410, an S-VLAN TAG 412, a C-VLAN tag 414, and an L2 payload 416. PBB-EVPN packet 400 may include other fields not shown, such as an outer transport label and inner MPLS service label that may be an MPLS label that uniquely identifies PE devices within an EVPN instance (EVI).

PE device 6C, when sending a network packet to other PE devices, e.g., PE device 6B, may include a destination B-MAC address 402 that includes a B-MAC address associated with Ethernet segment 13 ("ESI_B-MAC 403"), and a source B-MAC address 404 (e.g., B-MAC1). As described in this disclosure, ESI_B-MAC 430 may instruct a receiving PE device to perform a lookup of the B-MAC and C-VLAN table as shown in FIG. 4C.

PBB-EVPN packet 400 also includes service ID (I-SID) 406. I-SID 406 may be an identifier of a PBB B-Service instance such as the aforementioned B-MAC1 and B-MAC2 addresses. PBB-EVPN packet 400 also includes destination C-MAC address 408 and source C-MAC address 410. In one example, when PE device 6C sends a network packet to PE device 6B, destination C-MAC address 408 may be a C-MAC address of subscriber device 4B and source C-MAC 410 may be a C-MAC address of subscriber device 4A.

When PE device 6B receives the PBB-EVPN packet 400 from PE device 6C, PE device 6B may determine that the PBB header includes ESI_B-MAC 403, which instructs PE device 6B to lookup the B-MAC and C-VLAN table to determine the local interface associated with the received packet. This in turn enables PE device 6B to forward the return traffic to the local interface without having to perform a destination C-MAC lookup.

FIG. 4B illustrates an example B-MAC table 420 maintained by a forwarding engine of a PE device, such as PE device 6B. For example, forwarding engine 86 may be programmed by routing engine 84 to store B-MAC table 420, which includes entries for Ethernet segment identifier (ESI) values, B-MAC addresses, and logical interfaces (IFLs). For instance, entry 422 may include an ESI value (e.g., "ESI 13"). In one example, ESI value 422 is a unique identifier of Ethernet segment 13, such as a non-zero ESI value to represent a multi-homed connection and/or a zero ESI value to represent a single-homed connection. In such case, PE device 6B may include a separate data structure that includes ESI value 422 associated with a list that includes identifiers of PE devices included in Ethernet segment 13. In another example, ESI value 422 is a pointer or reference to a list of identifiers of PE devices included in Ethernet segment 13. The identifiers of the PE devices included in Ethernet segment 13 may include IP addresses, MAC addresses, MPLS labels advertised by the respective PE devices, or any other suitable identifier for identifying a PE device. B-MAC value 424 may also include a B-MAC address (e.g., "B-MAC1"), which is a B-MAC address associated with Ethernet segment 13. Because B-MAC1 is included in the same entry 424 as ESI value 422, B-MAC1 is associated with PE devices included in Ethernet segment 13, and more generally, associated with Ethernet segment 13. Entry 424 may further include IFLs 426 to identify the local interfaces associated with Ethernet segment 13.

FIG. 4C is a block diagram that illustrates an example B-MAC and C-VLAN table 430 maintained by a forwarding engine of a PE device, such as PE device 6B. For example, forwarding engine 86 may be programmed by routing engine 84 to store B-MAC and C-VLAN table 430, which forwarding engine 86 utilizes when processing packets to associate a B-MAC address with a local interface associated with the ESI. In other words, the B-MAC and C-VLAN table 430 identifies the C-VLAN, and in turn the correct interface, for which the return traffic is forwarded. The B-MAC and C-VLAN table 430 may include pairs of B-MAC address and C-VLAN addresses. For example, entry 432 of the B-MAC and C-VLAN table 430 may include a B-MAC address of PE device 6B (e.g., "B-MAC1") and the associated C-VLAN address 434 (e.g., C-VLAN of customer network 7A). PE device 6B may utilize the B-MAC and C-VLAN table 430 to map and associate a packet accordingly.

In one example, in accordance with techniques of the disclosure, PE device 6B may receive return traffic 12, which may take the form of PBB-EVPN Packet 400, from PBB-EVPN 23. PE device 6B receives the return traffic 12 from PE device 6C via a core-facing interface, such as one of IFCs 88. Forwarding engine 86 of PE device 6B may perform a lookup operation to determine the next hop. PE device 6B may identify keys associated with the received traffic 12. PE device 6B may perform lookup operations based on the identified keys (e.g., destination B-MAC address), such as a lookup of a B-MAC route table 420 and a B-MAC and C-VLAN table 430. For example, a lookup of the B-MAC route table 420 enables PE device 6B to determine that entry 422 includes ESI 13. PE device 6B may further determine that B-MAC1 is associated with a plurality of interfaces to customer network 7A. PE device 6B may then perform a lookup on the B-MAC and C-VLAN table 430 to determine the C-VLAN address associated with the B-MAC1 address. This in turn provides PE device 6B the information it needs to forward traffic toward Ethernet segment 13.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a provider edge (PE) device of a plurality of PE devices that implement a provider backbone bridging Ethernet Virtual Private Network (PBB-EVPN), a packet over the PBB-EVPN, wherein the plurality of PE devices is coupled to a multi-homed customer edge (CE) device by an Ethernet segment and provide an active-active configuration for the PBB-EVPN;
determining, by the PE device, a local interface of the PE device via a lookup operation based at least on a backbone Media Access Control (B-MAC) address and a customer Virtual Local Area Network (C-VLAN) address specified by the packet without determining the local interface based on a destination customer Media Access Control (C-MAC) address specified by the packet; and
sending, by the PE device, the packet to the CE device via the local interface.

2. The method of claim 1, further comprising:
determining, by the PE device, that the B-MAC address within the packet is associated with an Ethernet segment identifier (ESI) of the Ethernet segment; and
in response to determining that the B-MAC address is associated with the ESI, invoking, by the PE device, the lookup operation based at least on the B-MAC address and the C-VLAN address to determine the local interface of the PE device without basing the lookup on the destination C-MAC address specified by the packet.

3. The method of claim 2, wherein the association of the B-MAC address and the ESI of the Ethernet segment is pre-configured by an administrator.

4. The method of claim 2, wherein the B-MAC address associated with the ESI comprises a pre-defined address providing an indication that the packet is a unicast traffic to be forwarded to the Ethernet segment.

5. The method of claim 2, wherein the B-MAC address associated with the ESI comprises a pre-defined address providing an indication that the packet is a Broadcast, Unknown unicast, and Multicast (BUM) traffic to be forwarded to the Ethernet segment.

6. The method of claim 1, further comprising:
constructing, by the PE device, a routing table comprising at least the B-MAC address and the C-VLAN address.

7. The method of claim 1, wherein the PE device is a non-designated forwarder for the Ethernet segment.

8. The method of claim 1, further comprising:
responsive to receiving the packet, performing a first lookup to attempt to determine the local interface based on the destination C-MAC address specified by the packet;
determining, by the PE device, that the lookup based on the destination C-MAC address failed; and
in response to determining that the lookup based on the destination C-MAC address failed, invoking, by the PE device, the lookup operation based at least on the B-MAC address and the C-VLAN address to determine the local interface of the PE device using the destination C-MAC address specified by the packet.

9. A provider edge (PE) device comprising:
a routing component having at least one processor coupled to a memory, wherein the routing component executes software configured to establish a provider backbone bridging Ethernet Virtual Private Network (PBB-EVPN) with one or more other PE devices;
a core-facing interface to receive packets over the PBB-EVPN;
a customer-facing interface that connects the PE device to a customer edge (CE) device by an Ethernet segment, wherein the CE device is multi-homed to a second one of the other PE devices by the Ethernet segment, and wherein the PE device and the second one of the other PE devices provide an active-active configuration for the PBB-EVPN;
a forwarding component configured to:
determine a local interface of the PE device via a lookup operation based at least on a backbone Media Access Control (B-MAC) address and a customer Virtual Local Area Network (C-VLAN) address; and
send the packet to the CE device via the local interface.

10. The PE device of claim 9, wherein the forwarding component is further configured to:
determine that the B-MAC address within the packet is associated with an Ethernet segment identifier (ESI) of the Ethernet segment; and
in response to determining that the B-MAC address is associated with the ESI, invoke the lookup operation based at least on the B-MAC address and the C-VLAN address to determine the local interface of the PE device without basing the lookup on the destination C-MAC address specified by the packet.

11. The PE device of claim 10, wherein the association of the B-MAC address and the ESI of the Ethernet segment is pre-configured by an administrator.

12. The PE device of claim 10, wherein the B-MAC address associated with the ESI comprises a pre-defined address providing an indication that the packet is a unicast traffic to be forwarded to the Ethernet segment.

13. The PE device of claim 10, wherein the B-MAC address associated with the ESI comprises a pre-defined address providing an indication that the packet is a Broadcast, Unknown unicast, and Multicast (BUM) traffic to be forwarded to the Ethernet segment.

14. The PE device of claim 9, wherein the forwarding component is further configured to:
construct a routing table comprising at least the B-MAC address and the C-VLAN address.

15. The PE device of claim 9, wherein the PE device is a non-designated forwarder for the Ethernet segment.

16. The PE device of claim 9, wherein the forwarding component is further configured to: eschew a destination customer Media Access Control (C-MAC) address lookup.

17. The PE device of claim 9, wherein the forwarding component is further configured to:
responsive to receiving the packet, perform a first lookup to attempt to determine the local interface based on the destination C-MAC address specified by the packet;
determine that the lookup based on the destination C-MAC address failed; and
in response to determining that the lookup based on the destination C-MAC address failed, invoke the lookup operation based at least on the B-MAC address and the C-VLAN address specified by the packet.

18. A system comprising:
a provider backbone bridging Ethernet Virtual Private Network (PBB-EVPN) coupling at least a first provider edge (PE) device, a second PE device, and a third PE device, wherein the first PE device and second PE device are coupled to a multi-homed customer edge (CE) device by an Ethernet segment and provide an active-active configuration for the PBB-EVPN;
wherein the first PE device is a designated forwarder configured to forward originating traffic over the PBB-EVPN to the third PE device,
wherein the second PE device is a non-designated forwarder configured to:
receive a packet over the PBB-EVPN from the third PE device;
determine a local interface of the second PE device via a lookup operation based at least on a backbone Media Access Control (B-MAC) address and a customer Virtual Local Area Network (C-VLAN) address specified by the packet without determining the local interface based on a destination customer Media Access Control (C-MAC) address specified by the packet; and
send the packet to the CE device via the local interface, and
wherein the third PE device is configured to load-balance the return traffic to the first PE device and the second PE device.

* * * * *